(12) United States Patent
Oshima

(10) Patent No.: US 7,649,774 B2
(45) Date of Patent: Jan. 19, 2010

(54) METHOD OF CONTROLLING MEMORY SYSTEM

(75) Inventor: Takashi Oshima, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 327 days.

(21) Appl. No.: 11/680,978

(22) Filed: Mar. 1, 2007

(65) Prior Publication Data

US 2007/0208913 A1 Sep. 6, 2007

(30) Foreign Application Priority Data

Mar. 2, 2006 (JP) ............................. 2006-056431

(51) Int. Cl.
*G11C 11/34* (2006.01)
*G11C 16/04* (2006.01)
*G11C 8/00* (2006.01)
*G06F 13/00* (2006.01)

(52) U.S. Cl. .......................... 365/185.11; 365/185.08; 365/185.17; 365/230.03; 711/165; 711/170; 711/171; 711/173

(58) Field of Classification Search ............ 365/185.08, 365/185.11, 185.17, 230.03; 711/165, 170, 711/171, 173
See application file for complete search history.

(56) References Cited

U.S. PATENT DOCUMENTS

| 6,459,644 | B2* | 10/2002 | Mizushima et al. ..... 365/230.01 |
| 6,941,411 | B2* | 9/2005 | Roohparvar ................ 711/103 |
| 7,130,979 | B2* | 10/2006 | Wong ......................... 711/165 |
| 7,139,864 | B2* | 11/2006 | Bennett et al. .............. 711/103 |
| 7,350,044 | B2* | 3/2008 | Keays ......................... 711/165 |
| 2002/0188805 | A1* | 12/2002 | Kottapalli ................... 711/119 |
| 2004/0044840 | A1* | 3/2004 | Wong ......................... 711/105 |
| 2005/0172068 | A1 | 8/2005 | Sukegawa |
| 2005/0268026 | A1 | 12/2005 | Oshima |

* cited by examiner

*Primary Examiner*—Ly D Pham
(74) *Attorney, Agent, or Firm*—Oblon, Spivak, McClelland, Maier & Neustadt, L.L.P.

(57) ABSTRACT

A memory unit includes a plurality of first blocks each having a first block size. Each of the first blocks stores data of a plurality of second blocks each having a second block size which is smaller than the first block size. A control unit writes the data of the second block in the first block. The control unit is configured such that in a case where the second block to be written is a block that is to be written in the same first block as the second block that is already written in the first block, the second block to be written is written in the same first block even if an address of the second block to be written is not consecutive to an address of the second block that is already written in the first block.

17 Claims, 10 Drawing Sheets

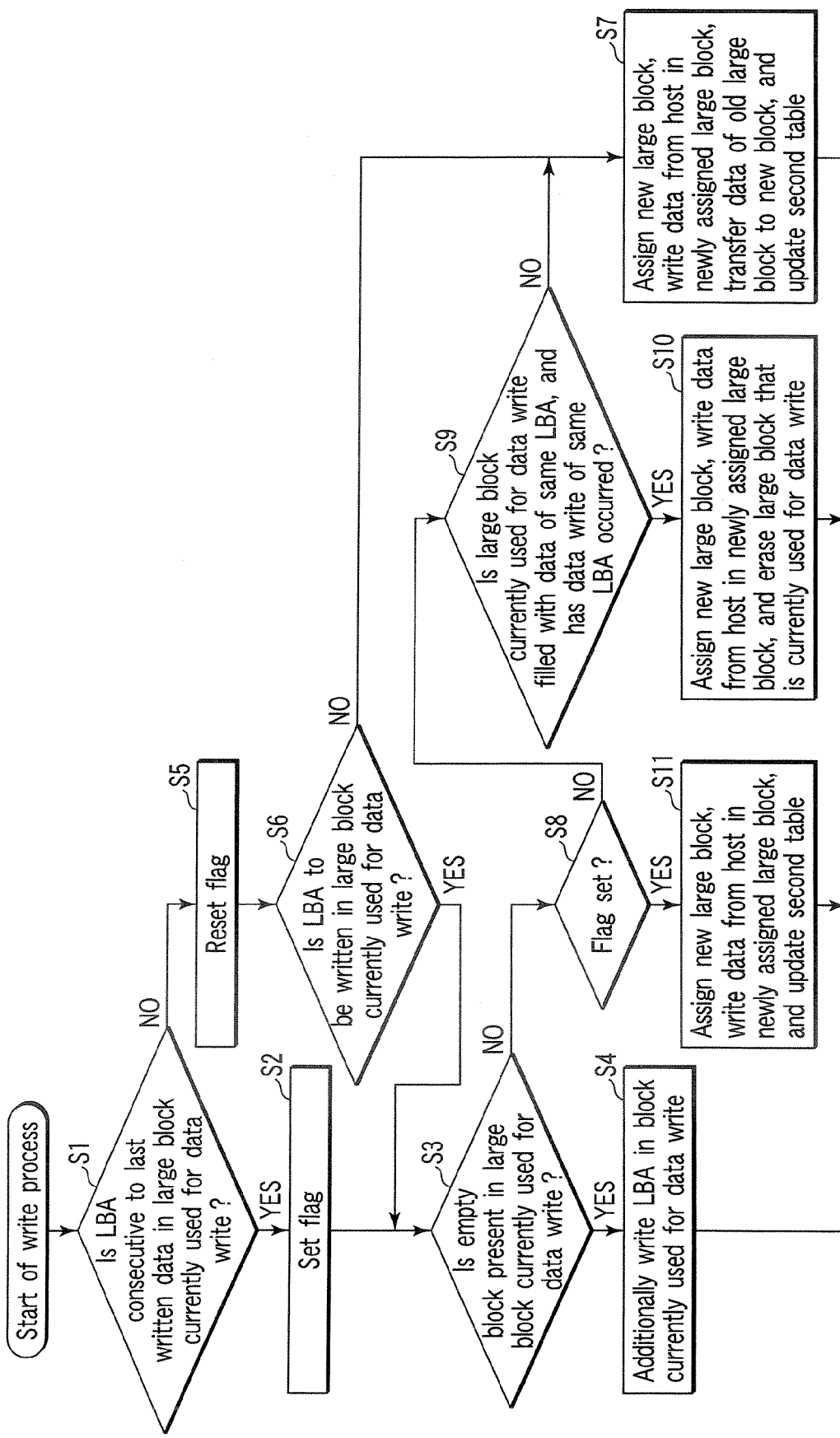
F I G. 1

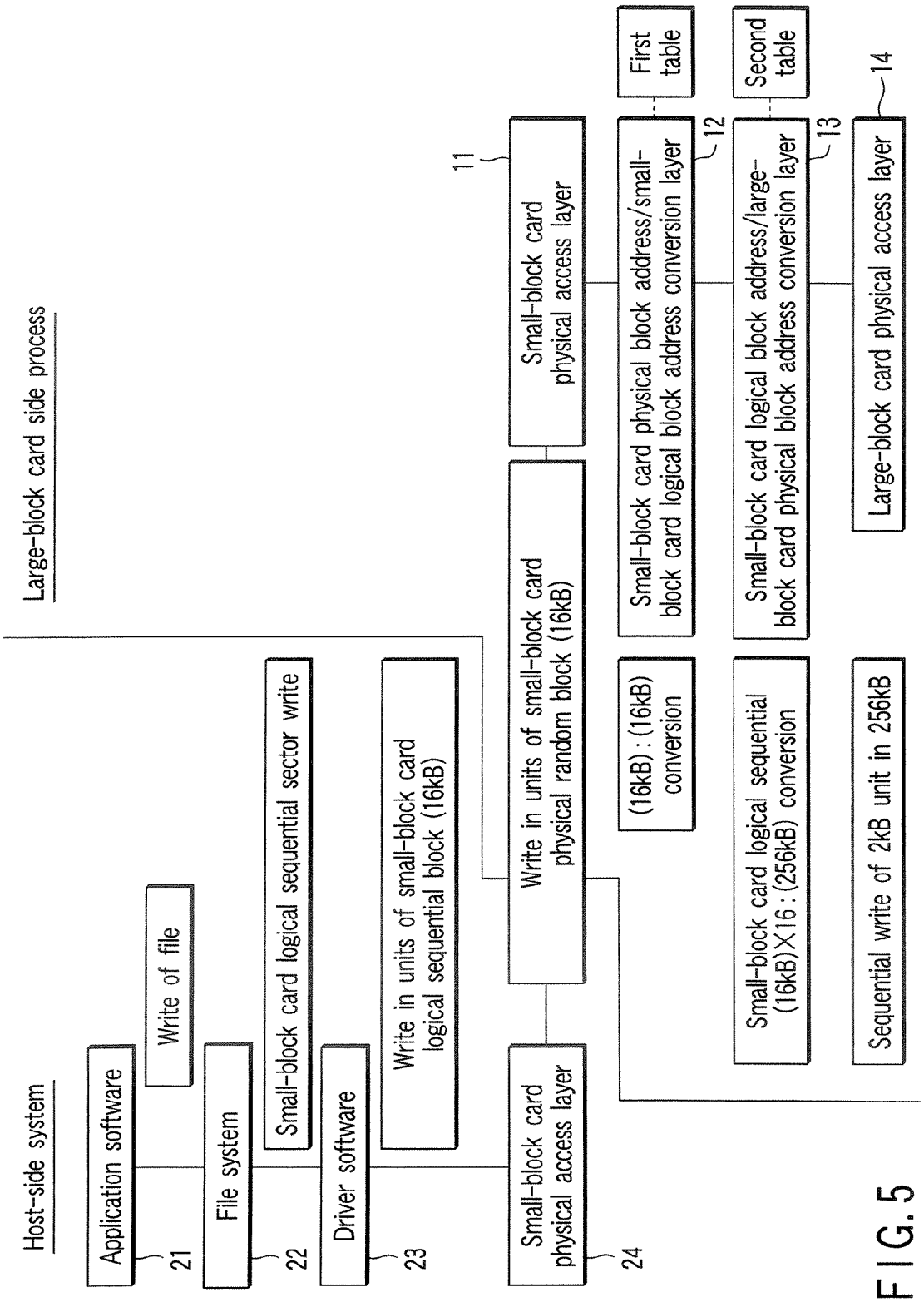
F I G. 5

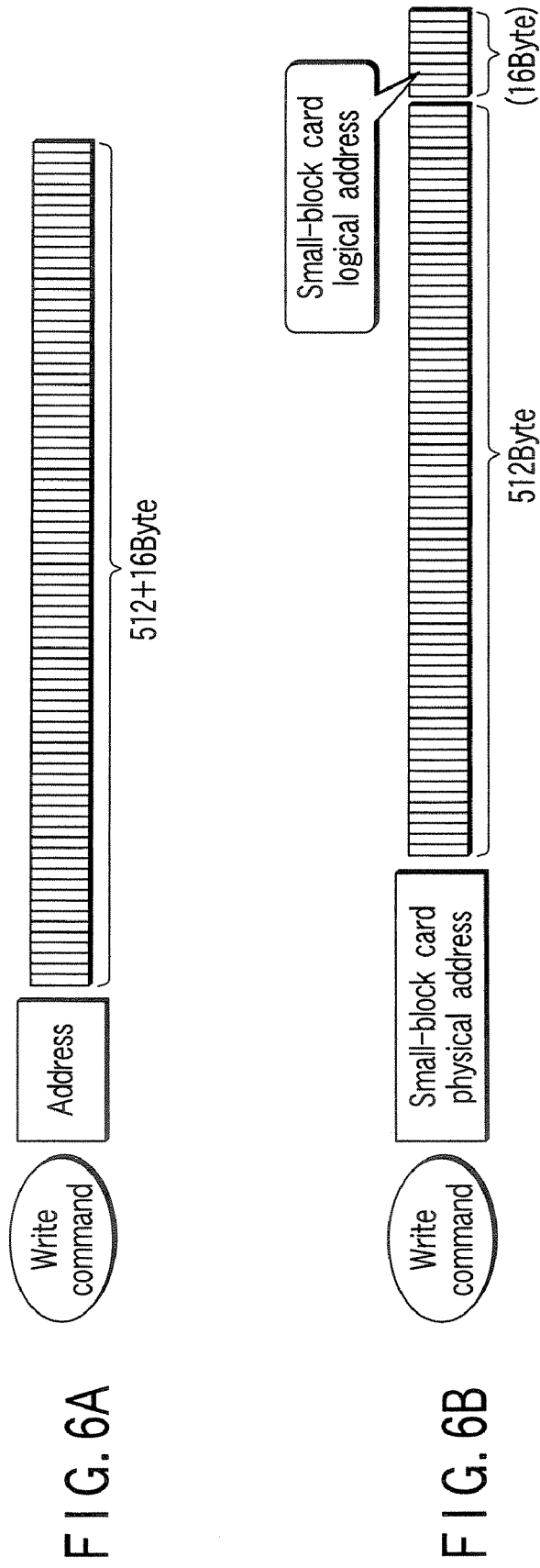
F I G. 6A
F I G. 6B

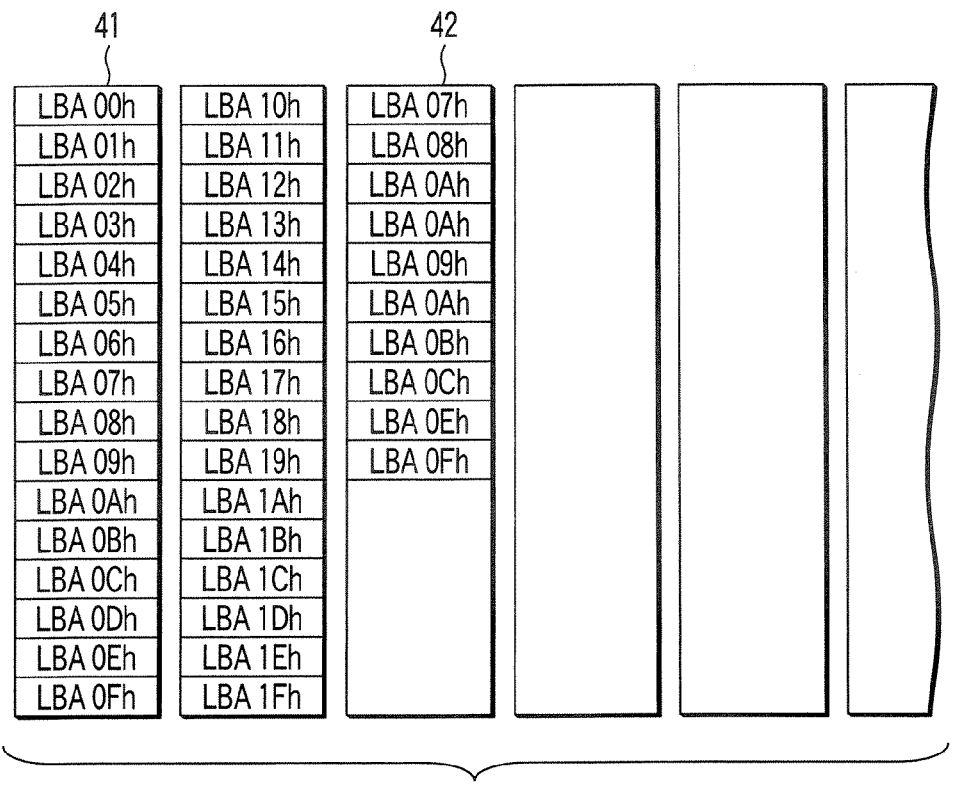
F I G. 12
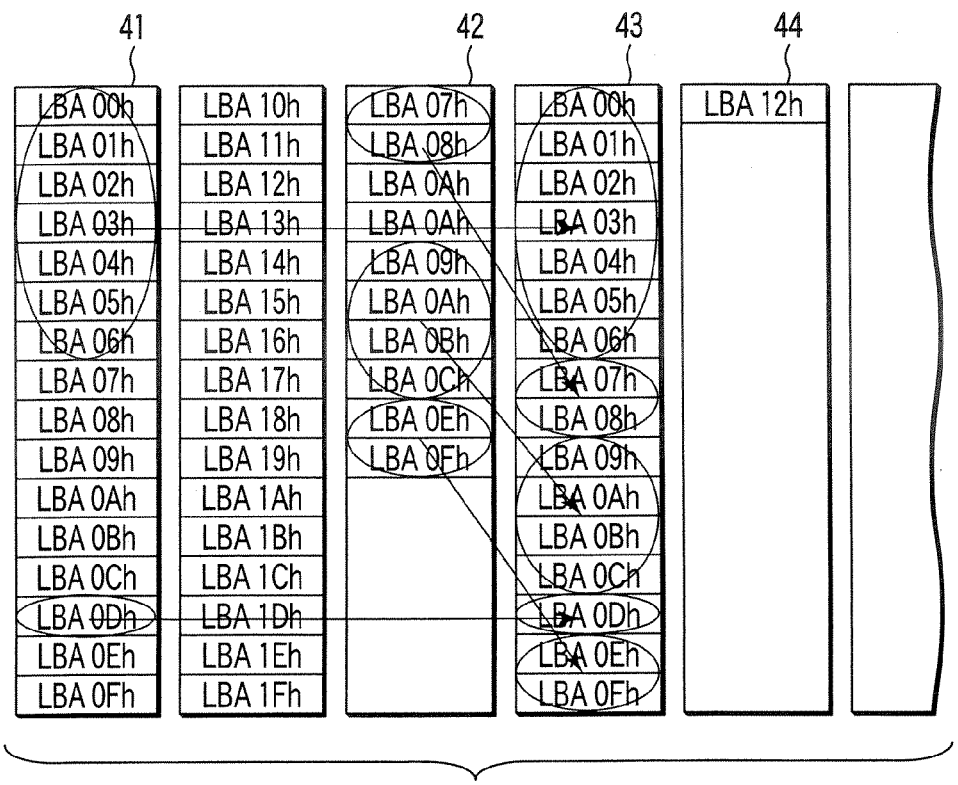
F I G. 13

| 41 | | 42 | 43 | 44 | |
|---|---|---|---|---|---|
| LBA 00h | LBA 10h | LBA 07h | LBA 00h | LBA 01h | |
| LBA 01h | LBA 11h | LBA 08h | LBA 01h | | |
| LBA 02h | LBA 12h | LBA 0Ah | LBA 02h | | |
| LBA 03h | LBA 13h | LBA 0Ah | LBA 03h | | |
| LBA 04h | LBA 14h | LBA 09h | LBA 04h | | |
| LBA 05h | LBA 15h | LBA 0Ah | LBA 05h | | |
| LBA 06h | LBA 16h | LBA 0Bh | LBA 06h | | |
| LBA 07h | LBA 17h | LBA 0Ch | LBA 07h | | |
| LBA 08h | LBA 18h | LBA 0Eh | LBA 08h | | |
| LBA 09h | LBA 19h | LBA 0Fh | LBA 09h | | |
| LBA 0Ah | LBA 1Ah | LBA 0Eh | LBA 0Ah | | |
| LBA 0Bh | LBA 1Bh | LBA 0Fh | LBA 0Bh | | |
| LBA 0Ch | LBA 1Ch | LBA 0Eh | LBA 0Ch | | |
| LBA 0Dh | LBA 1Dh | LBA 0Fh | LBA 0Dh | | |
| LBA 0Eh | LBA 1Eh | LBA 0Eh | LBA 0Eh | | |
| LBA 0Fh | LBA 1Fh | LBA 0Fh | LBA 0Fh | | |

FIG. 14

| 41 | | 42 | 43 | | |
|---|---|---|---|---|---|
| LBA 00h | LBA 10h | LBA 07h | LBA 07h | | |
| LBA 01h | LBA 11h | LBA 07h | | | |
| LBA 02h | LBA 12h | LBA 07h | | | |
| LBA 03h | LBA 13h | LBA 07h | | | |
| LBA 04h | LBA 14h | LBA 07h | | | |
| LBA 05h | LBA 15h | LBA 07h | | | |
| LBA 06h | LBA 16h | LBA 07h | | | |
| LBA 07h | LBA 17h | LBA 07h | | | |
| LBA 08h | LBA 18h | LBA 07h | | | |
| LBA 09h | LBA 19h | LBA 07h | | | |
| LBA 0Ah | LBA 1Ah | LBA 07h | | | |
| LBA 0Bh | LBA 1Bh | LBA 07h | | | |
| LBA 0Ch | LBA 1Ch | LBA 07h | | | |
| LBA 0Dh | LBA 1Dh | LBA 07h | | | |
| LBA 0Eh | LBA 1Eh | LBA 07h | | | |
| LBA 0Fh | LBA 1Fh | LBA 07h | | | |

FIG. 15

METHOD OF CONTROLLING MEMORY SYSTEM

CROSS-REFERENCE TO RELATED APPLICATIONS

This application is based upon and claims the benefit of priority from prior Japanese Patent Application No. 2006-056431, filed Mar. 2, 2006, the entire contents of which are incorporated herein by reference.

BACKGROUND OF THE INVENTION

1. Field of the Invention

The present invention relates to a memory system including a nonvolatile semiconductor memory device, for example, a NAND-type flash memory, and more particularly to a method of controlling the same.

2. Description of the Related Art

Recently, electronic apparatuses, such as digital cameras and portable audio devices, have been configured such that memory cards are attachable to these electronic apparatuses. Photographic data and music data can be stored in the memory card. The memory card includes, for example, a NAND-type flash memory, and various data is written in the flash memory.

In the digital camera or portable audio device which functions as a host device that uses the memory card, a logical block address (LBA) is assigned to each data block having a data size of a small block (528 bytes×32 pages), and data write is executed in units of the LBA. On the other hand, the controller of the memory card writes the data in a large block (2112 bytes×128 pages) of the NAND-type flash memory. At this time, the controller assigns one large block to 16 LBAs, and writes the data in the large block in the order of LBAs. When the LBAs are consecutive, the data is successively written in the assigned large block by an additional write scheme. However, if LBAs, which are supplied from the host device, are inconsecutive, the data cannot successively be written in the large block. Thus, the controller newly assigns another empty large block, writes the data of the inconsecutive LBA in the newly assigned large block, and transfers the already written data to a new large block. Thereafter, the data, which is written in the old large block, is erased. In this manner, in the case of writing data with inconsecutive LBAs, it is necessary to assign a new large block and transfer already written data to the new large block, and there arises such a problem that the write time increases and the write performance of the memory card deteriorates. Under the circumstances, there has been a demand for a method of controlling the memory system, which can reduce the write time and suppress deterioration in write performance of the memory card.

Jpn. Pat. Appln. KOKAI Publication No. 2005-222228 discloses a memory card which enables access to the memory card even in the case where the block size of a write unit or an erase unit, for example, the erase unit, in a flash memory mounted on the memory card is increased.

BRIEF SUMMARY OF THE INVENTION

According to a first aspect of the present invention, there is provided a memory system comprising: a memory unit which includes a plurality of first blocks each having a first block size, each of the first blocks storing data of a plurality of second blocks each having a second block size which is smaller than the first block size; and a control unit which writes the data of the second block in the first block, the control unit being configured such that in a case where the second block to be written is a block that is to be written in the same first block as the second block that is already written in the first block, the second block to be written is written in the same first block even if an address of the second block to be written is not consecutive to an address of the second block that is already written in the first block.

According to a second aspect of the present invention, there is provided a method of controlling a memory system including a plurality of first blocks each having a first block size, each of the first blocks including a plurality of second blocks each having a second block size which is smaller than the first block size, the memory system being configured to write data of the second block in the first block, the method comprising: writing, in a case where the second block to be written is a block that is to be written in the same first block as the second block that is already written in the first block, the second block, which is to be written, in the same first block even if an address of the second block to be written is not consecutive to an address of the second block that is already written in the first block.

According to a third aspect of the present invention, there is provided a memory system comprising: a memory unit which includes a plurality of first blocks each having a first block size, each of the first blocks storing data of a plurality of second blocks each having a second block size which is smaller than the first block size; and a control unit which writes the data of the second block in the first block, the control unit being configured such that in a case where an empty block is present in the first block, the second block to be written is additionally written in the first block even if an address of the second block to be written is not consecutive to an address of the second block that is already written in the first block.

BRIEF DESCRIPTION OF THE SEVERAL VIEWS OF THE DRAWING

FIG. 1 is a flow chart illustrating the operation of a memory system according to an embodiment of the present invention;

FIG. 5 shows communication layers of the host-side system and memory card;

FIG. 6A and FIG. 6B show a format of a command which is sent from the host side;

FIG. 12 illustrates the write operation of inconsecutive LBAs according to the embodiment;

FIG. 13 illustrates the write operation of inconsecutive LBAs according to the embodiment;

FIG. 14 illustrates the write operation of inconsecutive LBAs according to the embodiment; and FIG. 15 illustrates the write operation of inconsecutive LBAs according to the embodiment.

DETAILED DESCRIPTION OF THE INVENTION

An embodiment of the present invention will now be described with reference to the accompanying drawings.

Figure 2:
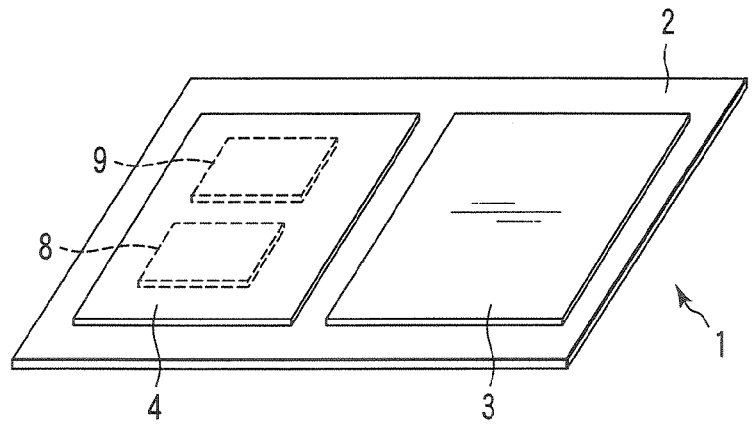
FIG. 2 is a perspective view showing general structures of devices which are mounted on a memory card according to the present embodiment.

FIG. 2 is a perspective view that schematically shows the structure of devices which are mounted on a memory card according to the embodiment.

A memory card 1 comprises a printed circuit board (PCB) board 2, and a NAND-type flash memory 3 and a controller 4 which are disposed on the PCB board 2. The controller 4 includes functional blocks such as a central processing unit (CPU) 8 and a read-only memory (ROM) 9. The NAND-type flash memory 3 may be a 2-value memory which stores 1-bit information in one memory cell, or a multi-value memory which stores information greater than 1 bit (e.g., 2 bits) in one memory cell. FIG. 2 shows the case in which the NAND-type flash memory 3 and controller 4 are disposed on the PCB 2 of the memory card. However, the NAND-type flash memory 3 and controller 4 may be disposed on the same large-scale integration (LSI) substrate.

Figure 3:
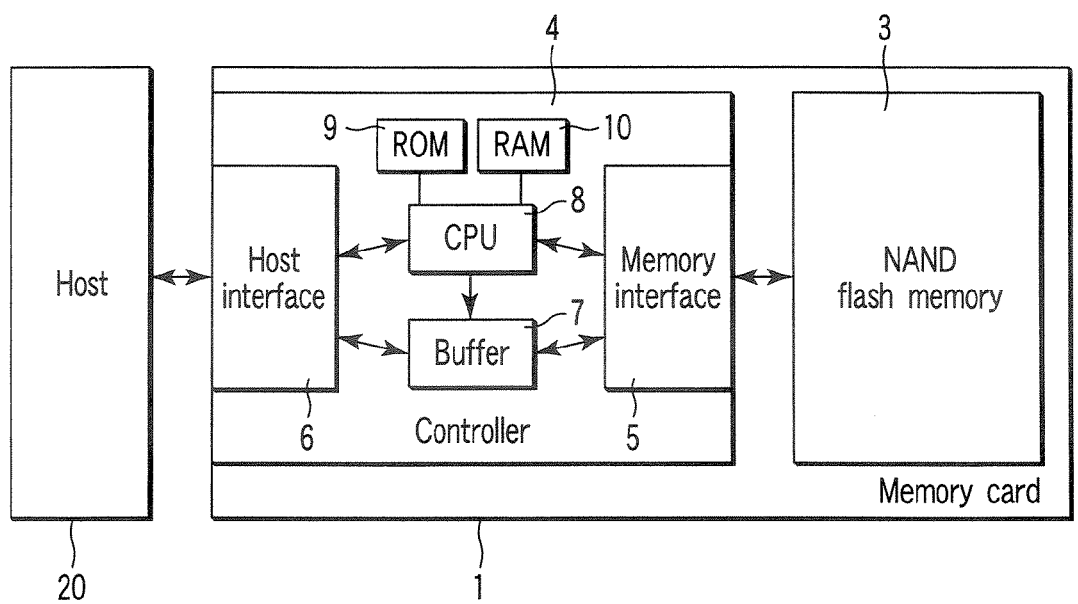
FIG. 3 is a block diagram showing a structure including a host and the memory card.

FIG. 3 is a block diagram showing a structure including a host device and the above-described memory card. In FIG. 3, the parts common to those shown in FIG. 2 are denoted by like reference numbers.

The host device (hereinafter referred to as a "host") 20 includes hardware and software (system) for accessing the connected memory card.

The memory card 1 receives power from the host 20 when it is connected to the host 20, and operates to execute a process corresponding to access from the host 20. The memory card 1, as described above, includes the NAND-type flash memory 3 and controller 4.

The NAND-type flash memory 3 is a nonvolatile memory in which a block size at an erase time (erase block size) is set at, e.g., 256 Kbytes. The NAND-type flash memory 3 is fabricated by using, e.g., 0.09 µm process technology. Specifically, the design rule of the NAND-type flash memory 3 is less than 0.1 µm.

The controller 4 includes, in addition to the above-described CPU 8 and ROM 9, a memory interface unit 5, a host interface unit 6, a buffer 7, and a random access memory (RAM) 10.

The memory interface unit 5 executes an interface process between the controller 4 and the NAND-type flash memory 3. The host interface unit 6 executes an interface process between the controller 4 and the host 20.

The buffer 7 temporarily stores a predetermined amount of data (e.g., 1-page data) when data which is sent from the host is to be written in the NAND-type flash memory 3, and also temporarily stores a predetermined amount data when data which is read from the NAND-type flash memory 3 is to be sent to the host 20.

The CPU 8 executes an overall control of the operation of the memory card 1. For example, when the memory card 1 is supplied with power, the CPU 8 loads firmware (control program), which is stored in the ROM 9, into the RAM 10, and executes a predetermined process. Specifically, the CPU 8 creates various tables in the RAM 10, receives a write command, a read command or an erase command from the host 20 and accesses an associated area in the NAND-type flash memory 3, and controls a data transfer process through the buffer 7.

The ROM 9 is a memory that stores, e.g., a control program which is used by the CPU 8. The RAM 10 is a volatile memory which is used as a working area of the CPU 8 and stores the control program and various tables.

Figure 4:
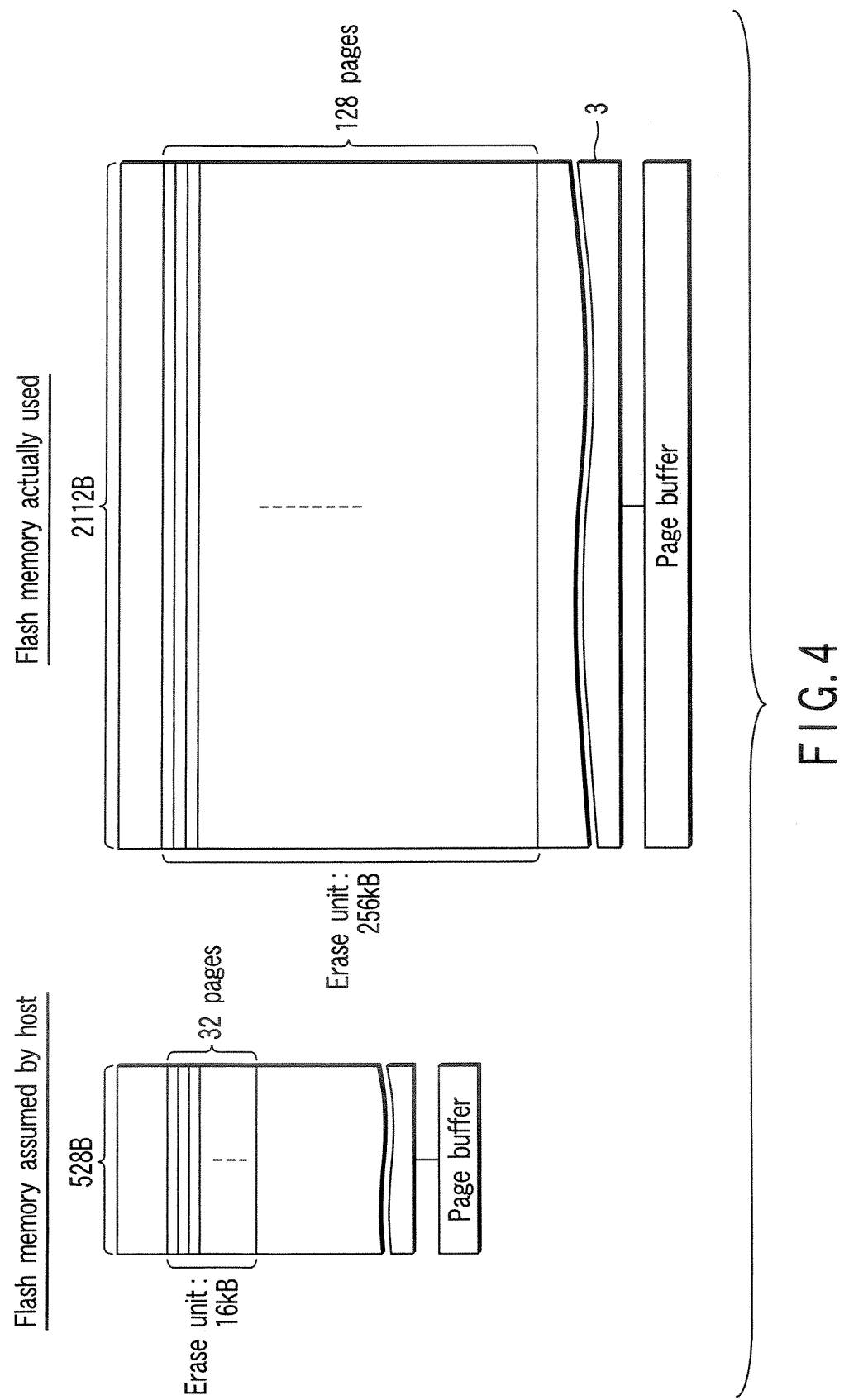
FIG. 4 shows a difference in data arrangement between a flash memory which is assumed by the host, and a flash memory which is actually used.

FIG. 4 shows a difference in data arrangement between a flash memory which is assumed by the host 20 and an actually used flash memory (i.e., NAND-type flash memory 3 in the memory card 1).

In the flash memory that is assumed by the host 20, each page has 528 bytes (512-byte data memory area+16-byte redundant area). 32 pages are one erase unit (i.e., 16 Kbytes+ 0.5 Kbytes). In the description below, a card including this flash memory is also referred to as a "small-block card".

On the other hand, in the actually used flash memory 3, each page has 2112 bytes (e.g., 512-byte data memory area× 4+10-byte redundant area×4+24-byte management data memory area), and 128 pages are one erase unit (i.e., 256 Kbytes+8 Kbytes). In the description below, a card including this flash memory is also referred to as a "large-block card". In addition, in the description below, the erase unit of the small-block card is referred to as 16 Kbytes, and the erase unit of the large-block card is referred to as 256 Kbytes.

Each of the flash memory that is assumed by the host 20 and the flash memory 3 that is actually used includes a page buffer for inputting/outputting data to/from the flash memory. The storage capacity of the page buffer, which is included in the flash memory that is assumed by the host 20, is 528 bytes (512 bytes+16 bytes). On the other hand, the storage capacity of the page buffer, which is actually used, is 2112 bytes (2048 bytes+64 bytes). At the time of, e.g., data write, each page buffer executes a data input/output process for the flash memory in units of one page corresponding to its own storage capacity.

FIG. 4 shows the case in which the erase block size of the actually used flash memory 3 is 16 times greater than the erase block size of the flash memory that is assumed by the host 20. However, the present embodiment is not limited to this example, and the erase block size of the actually used flash memory 3 may be set at another magnification, if it is substantially an integer number of times of the erase block size of the flash memory that is assumed by the host 20. In addition, the erase block size of the actually used flash memory 3 may be set to be equal to the erase block size of the flash memory that is assumed by the host 20.

In order to fabricate a practically effective large-block card, it is preferable that the storage capacity of the flash memory 3 shown in FIG. 4 be 1 Gbit or more. If the storage capacity of the flash memory 3 is, e.g., 1 Gbit, the number of 256-Kbyte blocks (erase units) is 512.

In addition, FIG. 4 shows, by way of example, the case in which the erase unit is the 256-Kbyte block. It is practically effective to adopt such a structure that the erase unit is, e.g., a 128-Kbyte block. In this case, the number of 128-Kbyte blocks is 1024.

In the example shown in FIG. 4, the erase block size of the actually used flash memory 3 is greater than the erase block size of the flash memory that is assumed by the host 20. However, the present embodiment is not limited to this example, and the erase block size of the actually used flash memory 3 may be designed to be smaller than the erase block size of the flash memory that is assumed by the host 20.

FIG. 5 shows communication layers of the host 20 side system and memory card 1 (large-block card).

The host 20 side system includes application software 21, a file system 22, driver software 23 and a small-block card physical access layer 24. On the other hand, the memory card 1 (large-block card) includes a small-block card physical access layer 11, a small-block card physical block address/ small-block card logical block address conversion layer 12, a small-block card logical block address/large-block physical block address conversion layer 13, and a large-block card physical access layer 14.

For example, if the application software 21 of the host 20 system sends a file write request to the file system 22, the file system 22 instructs the driver software 23 to execute sequential sector write on the basis of logical block addresses of the small-block card. Upon receiving the instruction, the driver software 23 realizes sequential write in units of a 16-Kbyte block on the basis of the logical block addresses of the small-block card. In this case, the driver software 23 executes logical/physical block conversion, and issues to the large-block card a random write command, which is based on the physical block address of the small-block card, through the small-block card physical access layer 24, thus executing data transfer.

In the write access, in the case of either the small-block card or large-block card, it is presupposed, for the reason of protocols, that information transmission/reception is executed in the order of (1) command, (2) page address (row address), (3) column address, (4) data and (5) program confirmation command. In the host, logical/physical block conversion may not be executed, and the memory card may be accessed by the logical address.

If the small-block card physical access layer 11 in the large-block card receives a write command, which is based on the physical block address of the small-block card, from the host 20, the small-block card physical access layer 11 acquires not only the physical block address and data, but also the logical block address included in the data accompanying the physical block address and data.

The small-block card physical block address/small-block card logical block address conversion layer 12 includes a first table for executing, at the time of, e.g., data read, a conversion process from the physical block address of the small-block card (corresponding to the 16-Kbyte block) to the logical block address of the small-block card (corresponding to the 16-Kbyte block). When the small-block card physical access layer 11 receives the write command and acquires the logical block address of the small-block card, the conversion layer 12 reflects the logical block address of the small-block card on the first table. The conversion layer 12 also reflects the physical block address on the first table.

The small-block card logical block address/large-block card physical block address conversion layer 13 includes a second table for executing, at the time of, e.g., data read, a conversion process from the logical block address of the small-block card (corresponding to the sequential 16-Kbyte block×16) to the physical block address of the large-block card (corresponding to the 256-Kbyte physical block). When the small-block card physical access layer 11 receives the write command and acquires the logical block address of the small-block card, the conversion layer 12 reflects the logical block address of the small-block card on the second table.

The large-block card physical access layer 14 determines the data arrangement in the flash memory 3 on the basis of the logical block address of the small-block card, which the small-block card physical access layer 11 has acquired upon receiving the write command. The large-block card physical access layer 14 then sequentially writes the 16-Kbyte data in units of 2 Kbytes (1 page) in the 256-Kbyte physical block. In addition, the large-block card physical access layer 14 stores the acquired logical block address and physical block address of the small-block card in a predetermined area in the management data area in the flash memory 3.

As has been described above, the host 20 issues the command based on the physical block address of the small-block card. Thus, the large-block card side executes such management as to understand which of the 256-Kbyte physical blocks includes the data corresponding to the physical block address of the small-block card. Specifically, the host 20 manages the correspondency of the logical/physical block addresses of the small-block card for each 16-Kbyte block, and executes such management as to understand which of 256-Kbyte physical blocks in the large-block card stores the data corresponding to the logical block addresses of consecutive 256-Kbyte blocks in the small-block card.

FIG. 6A and FIG. 6B show a format of a command which is sent from the host 20. As shown in FIG. 6A, the packet of the command, which is sent from the host 20, includes various items of information such as type-of-command information ("write" in this case), address (physical block address) and data (substantial data such as content and accompanying data [512 bytes+16 bytes]).

In the packet with this format, as shown in FIG. 6B, the "logical block address" of the small-block card (the logical address corresponding to the 16-Kbyte block to be accessed) is disposed at a predetermined position in the 16 bytes of the accompanying data. The large-block card acquires this "logical block address", in addition to the type-of-command information, physical block address and data. The "logical block address" is not added in the case of the read command.

Figure 7:
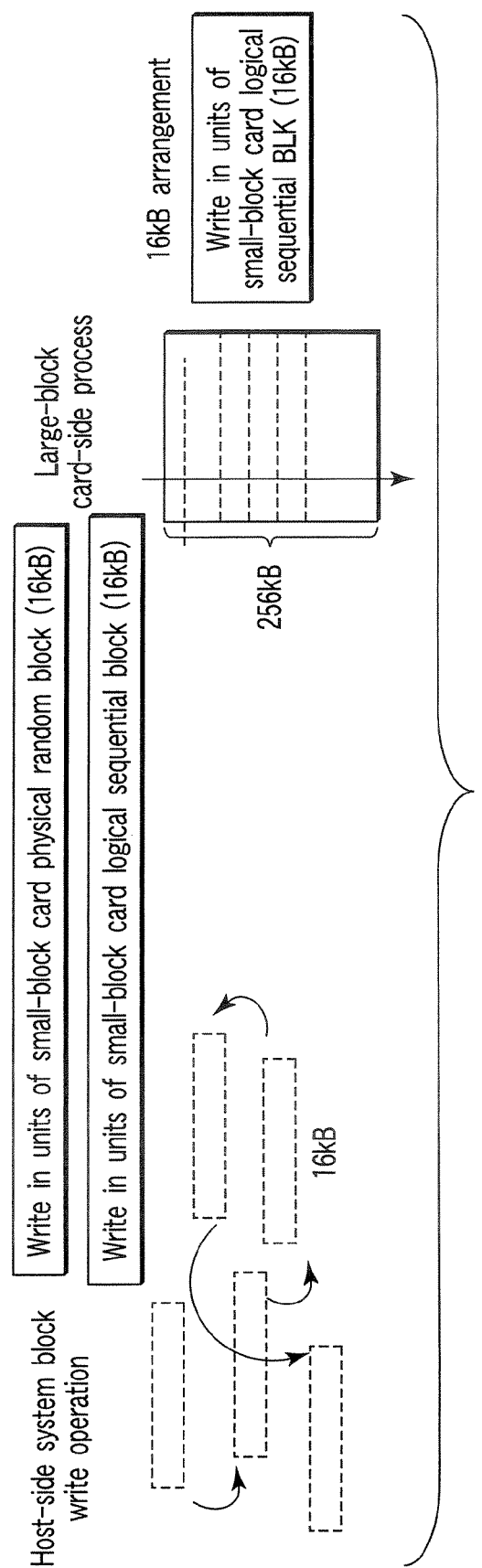
FIG. 7 shows, by comparison, a block write operation which is assumed by the host, and a write process which is actually executed by the memory card side.

FIG. 7 shows, by comparison, a block write operation which is assumed by the host 20, and a write process which is actually executed by the memory card (large-block card).

At the time of occurrence of a sequential write operation of the 16-Kbyte block unit on the basis of the logical address of the small-block card, the host 20 (the left side in FIG. 7) executes a random write operation of the 16-Kbyte block unit on the basis of the physical block address of the small-block card.

On the other hand, upon receiving the write command from the host 20, the large-block card (the right side in FIG. 7) sequentially writes in the NAND-type flash memory 3 the data of the 16-Kbyte block unit on the basis of the logical address of the small-block card.

As has been described above, the host 20 executes the random write operation of the 16-Kbyte unit on the basis of the physical address of the small block. In general, in the random write operation, a process of rewriting only a part of the large block (256 Kbytes) frequently occurs. However, on the large-block card (the right side in FIG. 7), consecutive block addresses are obtained from the information that accompanies the write command sent from the host, the object of access of which is the small-block card, and the data is arranged in the physical block of the large-block card in the order of logical block addresses of the small-block card. Therefore, it is possible to reduce the number of times of the process of rewriting only a part of the large block, and to suppress deterioration in write performance of the memory card due to transfer of data that has already been written.

Figure 8:
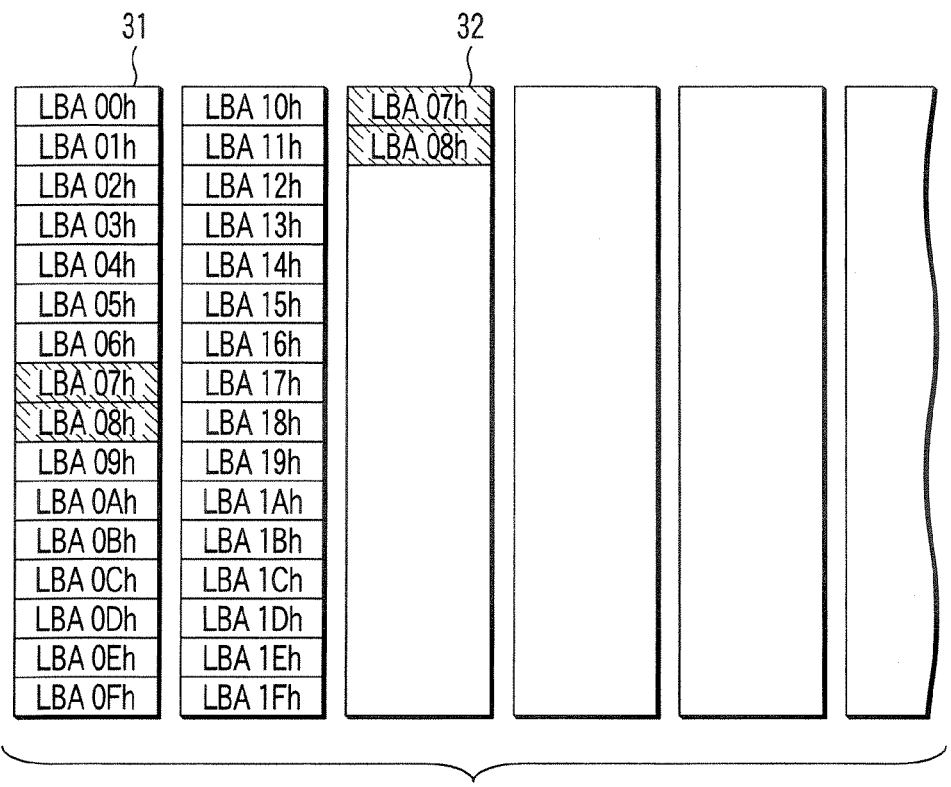
FIG. 8 illustrates a general write operation.
Figure 9:
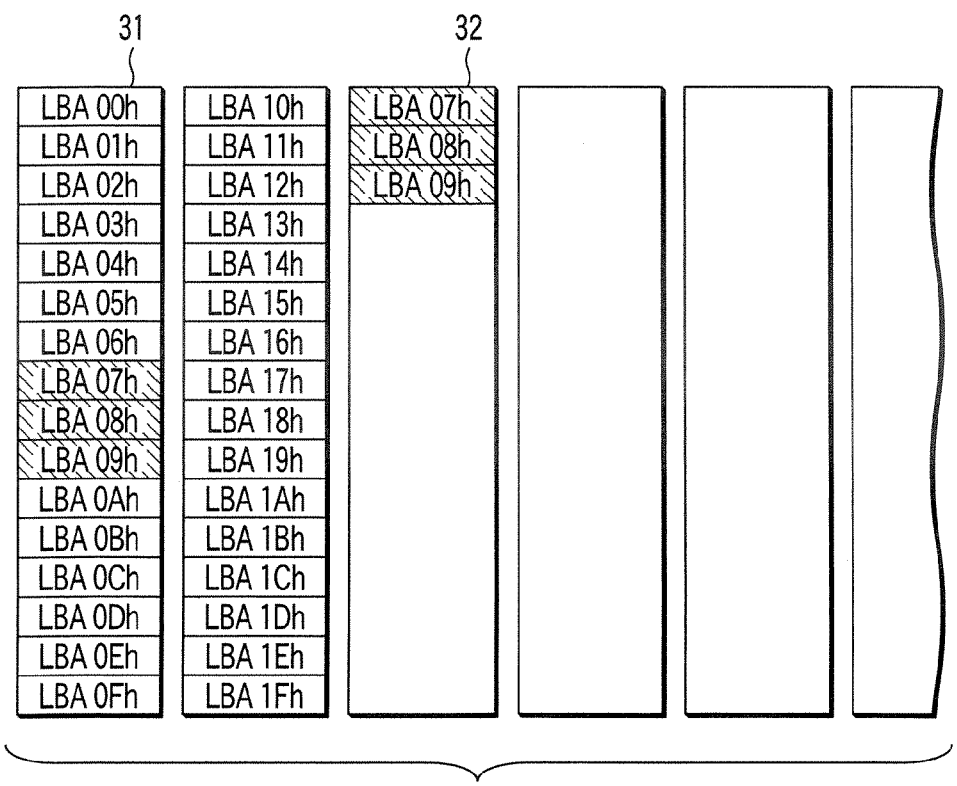
FIG. 9 illustrates the general write operation.
Figure 10:
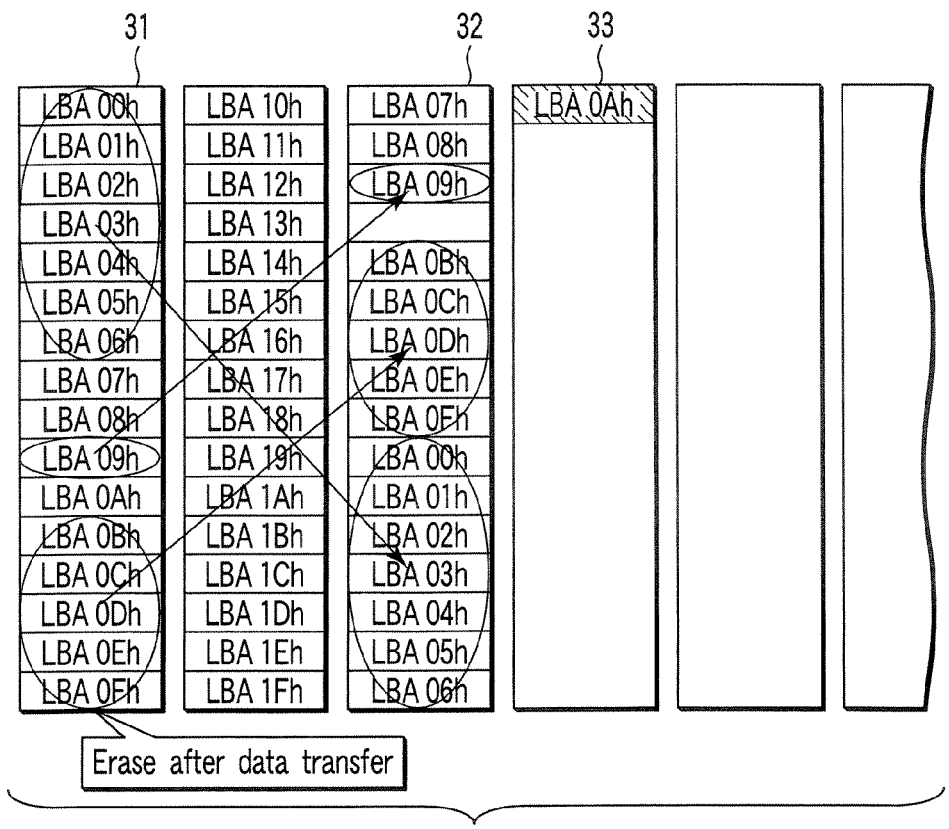
FIG. 10 illustrates the general write operation.

FIG. 8 to FIG. 10 illustrate a general write operation.

FIG. 8 shows large blocks of the NAND-type flash memory 3. FIG. 8 shows the case in which data of LBA07h and LBA08h (h=a hexadecimal number) in an old large block 31 have been rewritten. In this case, a new large block 32 is assigned, and new data of LBA07h and LBA08h are successively written in the new large block 32. In the write state shown in FIG. 8, if an LBA to be next written is LBA09h, data of LBA09h is written next to LBA08h in the new large block 32, as shown in FIG. 9.

On the other hand, in the write state shown in FIG. 8, if an LBA to be next written is LBA0Ah, LBA0Ah is not consecutive to LBA08h. Thus, in the general write control, as shown in FIG. 10, a new large block 33 is further assigned, and data of LBA0Ah is written in the new large block 33. Subsequently, LBA09h in the old large block 31 is transferred to a position next to the LBA08h in the new large block 32, and the data of LBA0Bh to LBA0Fh and the data of LBA00h to LBA06h are successively transferred to the new large block 32. As described above, when an inconsecutive LBA is to be written, the number of times of data transfer increases and, as a result, the write speed decreases.

On the other hand, FIG. 1 and FIGS. 11 to 15 illustrate a write operation according to the present embodiment. FIG. 1 illustrates the operation of the controller 4. Referring to FIG. 1, the write operation of the embodiment is explained.

In the data write operation, the controller 4 first determines whether an LBA, which is supplied from the host, is consecutive to a last written LBA in a large block which is currently used for data write (S1). If the LBA is consecutive, a flag is set (S2) and then it is determined whether an empty block is present in the large block that is currently used for data write (S3). If there is an empty block, the data of the next LBA is written in the large block that is currently used for data write, in the same manner as in the above-described general data write (S4).

On the other hand, if it is determined in step S1 that the LBA, which is supplied from the host, is not consecutive to the last written LBA in the large block which is currently used for data write, the flag is reset (S5). Subsequently, it is determined whether the LBA supplied from the host is an LBA which is to be written in the large block that is currently used for data write (S6). If it is determined that the LBA supplied from the host is an LBA which is to be written in the large block that is currently used for data write, it is then determined in step S3 whether an empty block is present in the large block that is currently used for data write. If there is an empty block, the data of the inconsecutive LBA is written next to the last written LBA in the large block that is currently used for data write (S4).

Figure 11:
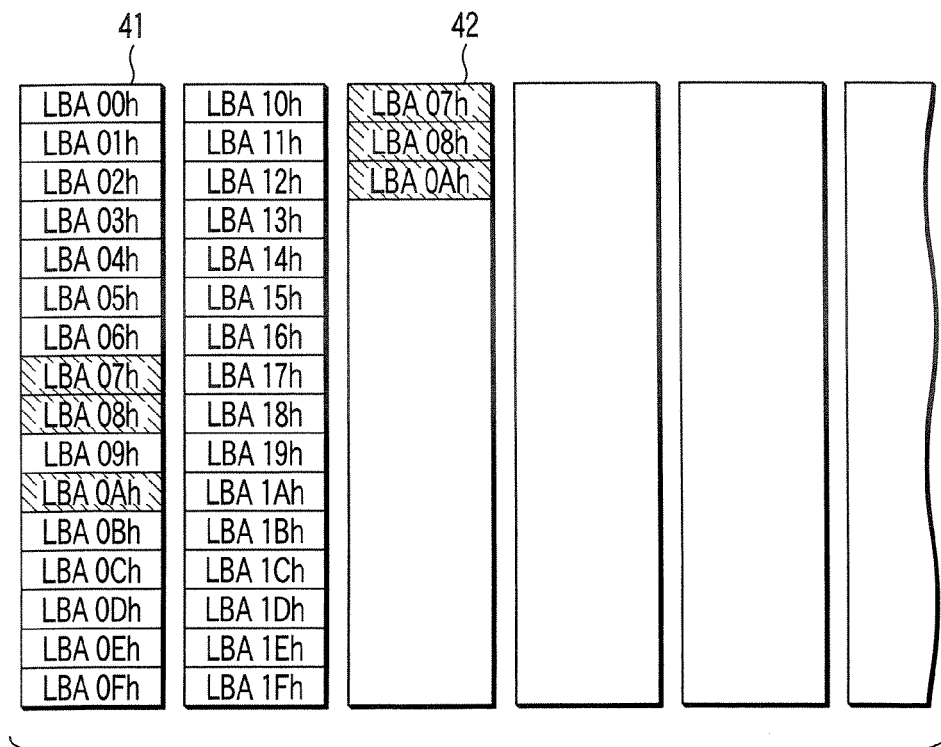
FIG. 11 illustrates a write operation of inconsecutive LBAs according to the embodiment.

FIG. 11 shows the case in which data of LBA0Ah is written after data of LBA07h and LBA08h (h=a hexadecimal number) in an old large block 41 are rewritten. The data of LBA0Ah is written next to LBA07h and LBA08h which are written in a new large block 42.

In short, in the present embodiment, even if an LBA to be written is not consecutive to the last written LBA, if the LBA is an LBA which is to be written in the large block that is currently used for data write, the LBA to be written is successively written in the large block that is currently used for data write. For example, as shown in FIG. 11, if the last written LBA is LBA0Ah, 256-Kbyte data (LBA00h to LBA0Fh) corresponding to 16 consecutive logical block addresses including LBA0Ah become LBAs which are to be written in the large block that is currently used for data write. In the case where data are to be written in this state in the order of LBA0Ah→LBA09h→LBA0Ah→LBA0Bh→LBA00h→LBA0Eh→LBA0Fh, the data of these inconsecutive LBAs are successively written in the large block 42 that is currently used for data write, as shown in FIG. 12. In other words, if data of an LBA to be written is data that is to be written in the same block as the large block that is currently used for data write, this data is written in the same large block 42 even if the LBA of this data that is to be written is not consecutive to the LBA of already written data in the large block 42 that is currently used for data write.

In step S6, if it is determined that the LBA supplied from the host is not an LBA which is to be written in the large block that is currently used for data write, a new large block is assigned and the data from the host is written in this new large block. At the same time, the data in the old large block is transferred to another new large block (S7).

FIG. 13 shows the case in which an LBA supplied from the host 20 is LBA12h. LBA12h is not an address (LBA0h to LBA0Fh) to be written in the large block 42 that is currently used for data write. In this case, new large blocks 43 and 44 are assigned. The data of LBA12h supplied from the host 20 is written in the large block 44. Further, at this opportunity, the data, which are inconsecutively written in the old large block 41 and the large block 42 that is currently used for data write, are rearranged in the order of LBAs and written in the new large block 43. In addition, the second table is updated so that the LBAs (LBA00h to LBA0Fh) of the data written in the large block 43 may correspond to the physical block addresses (corresponding to a 256-Kbyte physical block) of the large block 43.

In step S3, if it is determined that there is no empty block in the large block that is currently used for data write, it is then determined whether the flag indicative of the consecutiveness of the LBA is set or not (S8). If the flag is not set, the control advances to step S9, and it is determined whether the large block that is currently used for data write is filled with data of the same LBA and data write of the same LBA has occurred. If this condition is not satisfied, the control goes to step S7 and the same operation as described above is executed.

FIG. 14 shows the operation in the case in which an empty block is no longer present in the large block that is currently used for data write. In this case, data of LBA01h, which is to be written in the large block 42 that is currently used for data write, is written in the new large block 44. Further, the data, which are inconsecutively written in the old large block 41 and the large block 42 that is currently used for data write, are rearranged in the order of LBAs and written in the new large block 43. In addition, the second table is updated so that the LBAs of the data written in the large block 43 may correspond to the physical block addresses of the large block 43.

On the other hand, in step S9, if it is determined that the large block that is currently used for data write is filled with data of the same LBA and data write of the same LBA has occurred, a new large block 43 is assigned, as shown in FIG. 15, and data LBA07h from the host 20 is written in the new large block 43. Thereafter, the large block 42 that is currently used for data write is erased (S10).

In step S8, if it is determined that the flag is set, that is, if there is no empty block when the data of the consecutive LBA is to be written, a new large block is assigned and the data from the host is written in the new large block. In addition, the second table is updated so that the LBAs of the already written data in the large block may correspond to the physical block addresses of the large block (S11).

In the present embodiment, in the case where the address of data to be written is not consecutive to the address of already written data, a block that is currently used for data write is used as a block for additional write. If all data is written in the block in the order of LBAs, this block is used for ordinary data storage. In other words, if all data are written in the order of LBAs, there is no need to rearrange the already written data in the order of LBAs and to copy the rearranged data to a new block, as shown in FIG. 14, even if an empty block is no longer present in the large block that is currently used for data write. Thus, the second table is updated, and only the correspondency between the LBAs and the physical block addresses of the large block is updated.

In the present embodiment, the block for additional write and the block for data storage are different with respect to whether the physical block addresses of the block are to be reflected on the second table or not. If a block is determined to be a block for additional write, already written data are rearranged in the order of LBAs and copied to a new large block, and the physical block addresses of the new large block are reflected on the second table. In short, the block for additional write is not reflected on the second table and is managed separately from the block for data storage.

On the other hand, if all data are written in the large block in the order of LBAs, this large block is treated as the block for data storage. In this case, since the data is not copied to a new large block, the physical block addresses of the large block in which the data are written are directly reflected on the second table.

According to the present embodiment, in the case where an LBA supplied from the host is an LBA which is to be written in a large block which is currently used for data write, the LBA from the host, even if it is an inconsecutive LBA, is additionally written in the large block as long as there is an empty block. If there is no longer any empty block in the large block, a new large block is assigned and the data in the large block that is currently used for data write is transferred to the new large block. Thus, the number of times of assignment of a new large block and transfer of data can be reduced, and a decrease in write speed can be minimized.

In the case where an LBA supplied from the host is not an LBA which is to be written in a large block which is currently used for data write, a new large block is assigned and the data supplied from the host is stored in the new large block. Thus, the number of times of assignment of a new large block and transfer of data can be reduced, and a decrease in write speed can be minimized.

According to the embodiment, a large block that is currently used for data write is used as a block that is dedicated to additional write. Thus, there is no need to separately provide a block that is dedicated to additional write. Therefore, there is an advantage that a decrease in user data storage area can be prevented, and management of a block dedicated to additional write is needless.

The above-described embodiment exemplifies the case in which the host 20 issues to the memory card 1 a write command which is based on physical block addresses. The embodiment, however, is not limited to this example. The embodiment may adopt such a structure that the host 20 issues to the memory card 1 a write command which is based on logical block addresses.

Besides, the above-described embodiment exemplifies the case in which the controller 4 manages the first and second tables for executing the process of converting the physical block addresses (16-Kbyte block), which are issued by the host 20, to the physical block addresses (256-Kbyte block) of the flash memory 3, which are actually used. However, the embodiment is not limited to this example, and the embodiment may adopt such a structure that the controller 4 manages one table for executing the process of converting the logical addresses to the physical addresses of the flash memory 3 in the case where the host 20 issues the logical addresses to the memory card 1.

Further, in the embodiment, data are written in per LBA. The invention is not limited to this. For instance, the embodiment can also be applied when writing in data per page.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory system comprising:
    a memory unit which includes a plurality of first blocks each having a first block size, each of the first blocks storing data of a plurality of second blocks each having a second block size which is smaller than the first block size; and
    a control unit which writes the data of the second block in the first block, the control unit being configured such that in a case where the second block to be written is a block that is to be written in the same first block as the second block that is already written in the first block, the second block to be written is written in the same first block even if an address of the second block to be written is not consecutive to an address of the second block that is already written in the first block, wherein
    when the control unit writes the second block in the first block, if an address of the second block is not an address that is to be written in the same first block as the second block that is already written in the first block, the control unit writes data of the second block in another said first block.

2. The memory system according to claim 1, wherein when the control unit writes the second block in the first block, if an empty block is absent in the first block, the control unit writes the second block, which is to be written, in another said first block, and transfers the second block, which is already written in the first block, to another said first block.

3. The memory system according to claim 1, wherein in a case where the first block is filled with the second blocks having the same address and an address of the second block which is to be next written is the same as the address of the already written second blocks, the control unit assigns another said first block and writes data of the second block in the assigned first block.

4. The memory system according to claim 1, wherein the first block size is an erase block size.

5. The memory system according to claim 1, wherein the first block is used as a block for additional write in a case where the second block having an inconsecutive address is to be written in the first block, and the first block is used as a block for data storage in a case where all the second blocks in the first block are written in an order of addresses.

6. The memory system according to claim 1, wherein the memory unit is composed of a NAND-type flash memory.

7. A method of controlling a memory system including a plurality of first blocks each having a first block size, each of the first blocks including a plurality of second blocks each having a second block size which is smaller than the first block size, the memory system being configured to write data of the second block in the first block, the method comprising:
    writing, in a case where the second block to be written is a block that is to be written in the same first block as the second block that is already written in the first block, the second block, which is to be written, in the same first block even if an address of the second block to be written is not consecutive to an address of the second block that is already written in the first block, wherein
    when the second block is to be written in the first block, if an address of the second block is not an address that is to be written in the same first block as the second block that is already written in the first block, data of the second block is written in another said first block.

8. The method according to claim 7, wherein when the second block is to be written in the first block, if an empty block is absent in the first block, the second block, which is to be written, is written in another said first block, and the second block, which is already written in the first block, is transferred to another said first block.

9. The method according to claim 7, wherein in a case where the first block is filled with the second blocks having the same address and an address of the second block which is to be next written is the same as the address of the already written second blocks, another said first block is assigned and data of the second block is written in the assigned first block.

10. The method according to claim 7, wherein the first block size is an erase block size.

11. The method according to claim 7, wherein the first block is used as a block for additional write in a case where the second block having an inconsecutive address is to be written in the first block, and the first block is used as a block for data storage in a case where all the second blocks in the first block are written in an order of addresses.

12. The method according to claim 7, wherein the memory unit is composed of a NAND-type flash memory.

13. A memory system comprising:
a memory unit which includes a plurality of first blocks each having a first block size, each of the first blocks storing data of a plurality of second blocks each having a second block size which is smaller than the first block size; and
a control unit which writes the data of the second block in the first block, the control unit being configured such that in a case where an empty block is present in the first block, the second block to be written is additionally written in the first block even if an address of the second block to be written is not consecutive to an address of the second block that is already written in the first block, wherein
when the control unit writes the second block in the first block, if an address of the second block is not an address that is to be written in the same first block as the second block that is already written in the first block, the control unit writes data of the second block in another said first block.

14. The memory system according to claim 13, wherein when the control unit writes the second block in the first block, if an empty block is absent in the first block, the control unit writes the second block, which is to be written, in another said first block, and transfers the second block, which is already written in the first block, to another said first block.

15. The memory system according to claim 13, wherein in a case where the first block is filled with the second blocks having the same address and an address of the second block which is to be next written is the same as the address of the already written second blocks, the control unit assigns another said first block and writes data of the second block in the assigned first block.

16. The memory system according to claim 13, wherein the first block size is an erase block size.

17. The memory system according to claim 13, wherein the memory unit is composed of a NAND-type flash memory.

* * * * *